United States Patent Office 3,210,398
Patented Oct. 5, 1965

3,210,398
PENTAERYTHRITOL BIS-HYDROGEN THIOPHOSPHITE AND PROCESS THEREFOR
Rudi F. W. Rätz, Hamden, Conn., assignor to Olin Mathieson Chemical Corporation, New Haven, Conn., a corporation of Virginia
No Drawing. Filed Jan. 14, 1963, Ser. No. 251,039
6 Claims. (Cl. 260—461)

This invention relates to a novel bis-phosphonothionate, and more particularly it relates to pentaerythritol bis-hydrogen thiophosphite having the following structural formula:

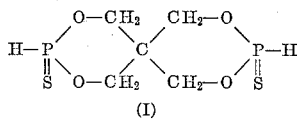

(I)

The correct chemical name for the above compound in accordance with Chemical Abstracts usage is 3,9-H-2,4,8,10-tetraoxa-3,9-diphosphaspiro[5.5]undecane-3,9-disulfide.

A necessary intermediate for the work described herein is 3,9-dichloro-2,4,8,10-tetraoxa-3,9 diphosphaspiro [5.5]undecane which is prepared by the reaction of pentaerythritol with phosphorus trichloride as described by Lucas et al. in J. Am. Chem. Soc. 72, 5491 (1950). This compound is represented by the following structural formula:

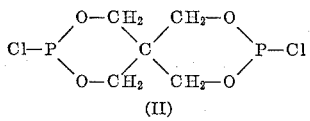

(II)

The principal object of this invention was to prepare a hitherto unknown spiro bis-phosphonothionate. Another object of this invention was to prepare a biologically active disulfide containing a spiro system with phosphorus atoms in both rings. Still another object of this invention was to utilize the dichloride (II) as an intermediate in the preparation of pentaerythritol bis-hydrogen thiophosphite. Still another object was to provide a simple and efficient process for the preparation of the disulfide (I). Other objects will be apparent from the following discussion.
The above objects have been accomplished in accordance with this invention. It has been found that pentaerythritol bis-hydrogen thiophosphite having the structural formula (I) can be prepared in good yield and high purity by a process described herein. More specifically, it has been found that the dichloride (II) can be reacted with hydrogen sulfide under certain experimental conditions to obtain the desired disulfide. A preferred process for the preparation of the disulfide is disclosed herein. Furthermore, the disulfide (I) posesses biological activity making it useful as an agricultural chemical particularly in the area of weed control.
The process disclosed herein for the preparation of pentaerythritol bis-hydrogen thiophosphite involves the reaction of the dichloride with hydrogen sulfide in the presence of selected solvents. An acid-binding agent is also advantageously employed in the process since hydrogen chloride is a process by-product. Many solvents in which the dichloride and hydrogen sulfide are mutually soluble are unsuitable for use in the preparation of the disulfide. For example, an attempt was made to prepare the disulfide by reacting the dichloride with hydrogen sulfide in chloroform solution while utilizing triethylamine as an acid-binding agent. Although the reaction appeared to proceed as desired as indicated by the formation of triethylamine hydrochloride, the disulfide could not be isolated.

However, it has now been found that the disulfide (I) can be prepared in good yield and high purity by utilizing a basic solvent such as, for example, one of the aliphatic N-dialkyl carboxylic acid amides as the required solvent. These compounds also function as acid-binding agents as well as being useful solvents. Dimethyl acetamide is an especially effective solvent, and the preferred process embodiment utilizes this solvent. However, another solvent which may be advantageously employed in the process of this invention is dimethylformamide. The use of such solvents is also advantageous in that the disulfide product precipitates from these solvents upon the addition of water and can be readily filtered by conventional methods. The crude disulfide can be purified by the usual methods such as by recrystallization from appropriate solvents.
The reaction of hydrogen sulfide and the dichloride is somewhat exothermic and can be performed satisfactorily at reaction temperatures of from about 0° C. to about 100° C. However, a preferred reaction temperature of about 0° C. to about 30° C. can be utilized while controlling the exotherm by the use of external cooling means such as an ice bath.
At least an equivalent amount of hydrogen sulfide based on dichloride present should be utilized in the process, but an excess of hydrogen sulfide can be used with no detrimental effects.
Example 1 presented hereinafter describes the preparation of the dichloride intermediate, while Example 2 describes a preparation of the desired pentaerythritol bis-hydrogen thiophosphite. It is to be understood that this second example is merely illustrative and is not to be considered as limiting the scope of this invention since obvious process modifications would be apparent to those skilled in the art.

*Example 1*

Into a five liter three-necked flask equipped with stirrer and condenser was placed a solution of 453 g. (3.29 mole) of phosphorus trichloride in 2450 ml. of methylene chloride. Then 224.0 g. (1.645 mole) of pentaerythritol was added to the flask, and the mixture was heated to gentle reflux for 24 hours. After standing at room temperature for 48 hours, the practically clear solution was filtered and the methylene chloride was removed from the filtrate by distillation at atmospheric pressure. A slightly yellowish oil remained (413 g.) which solidified immediately upon pouring into a cooled beaker. This product was twice recrystallized from 150 ml. portions of chloroform (dried over anhydrous potassium carbonate). A considerable loss of material occurred during the recrystallization procedure despite the small amount of solvent applied. However, 131 g. of colorless crystals having a melting point of 121–123° C. was thus obtained. More product could be obtained from the mother liquid by cooling to −20° C. for 48 hours.

*Example 2*

A solution of 10.0 g. of 3,9-dichloro-2,4,8,10-tetraoxa-3,9-diphosphaspiro[5.5]undecane (prepared in Ex. 1) in 30 ml. of cold dimethylacetamide was prepared and placed in a 100 ml. two-necked flask equipped with gas inlet tube and condenser. The condenser was connected with a calcium chloride tube for moisture protection. A moderate stream of dry hydrogen sulfide was passed into the solution for 30 minutes while the flask was immersed in an ice-water bath. Separation of dimethylacetamide hydrochloride started after 10 minutes, and 6.0 g. of this salt was obtained after 30 minutes. Continuation of the hydrogen sulfide treatment for another 30 minutes did not cause further hydrochloride separation. Another crop of 1.2 g. however was obtained after storage for two days of the solution at −15° C. Thus, a total of 7.2 g. of hydrochloride was obtained as compared with the theoretical amount of 9.35 g. The desired product was precipated from solution by the addition of 50 ml. of water, and the resulting white, somewhat tacky material was collected by filtration. The dried solid product was obtained in an amount of 4.5 g. This crude material gave a negative Beilstein test and proved also to be chlorine free as demonstrated by sodium fusion. The preferred recrystallization solvent was o-dichlorobenzene, but glacial acetic acid and xylene could also be used for recrystallization. The crystals obtained from o-dichlorobenzene melted at 204–205° C., those from glacial acetic acid at 199–201° C. They were readily soluble in acetone, sparingly soluble in ether, and insoluble in water. The following analytical data revealed that the desired 3, 9-H-2,4,8,10-tetraoxa-3,9 - diphosphaspiro[5.5]undecane-3,9-disulfide had been obtained. Yield: 46%.

*Analysis.*—Calcd. for $C_5H_{10}O_4P_2S_2$: C, 23.05; H, 3.85; P, 23.83; S, 24.60. Found: C, 23.08; H, 3.97; P, 23.3; S, 24.19.

The disulfide obtained in Example 2 was dissolved in acetone, and nuclear magnetic resonance studies were conducted on the solution. The spectrum was consistent with the structure (I), and it showed the presence of P—H coupling (618 cycles). There was no indication of the P—SH coupling which would be found in the possible tautomeric thiol.

An infrared spectrum indicated the presence of phosphorus-hydrogen linkage by a strong absorpttion at 4.2μ.

The novel disulfied of this invention is useful as a herbicide especially in the controlling of noxious weeds. This has been shown by herbicide tests, as disclosed in "Weeds," vol. 1, pp. 352–365, 1952. The compound showed activity at a dosage of 10 pounds per acre on preemergence tests. The crops tested included wheat, corn, cotton, and soybean. The compound was particularly effective in eliminating mustard weed, but it was also quite effective in eliminating undesirable crab grass and pig weed.

The novel disulfied has a high degree of hydrolytic stability which makes it useful as a component in resin formulations. For example, it is particularly useful as a component in the preparation of flame-resistant organic resins. Resins have previously been prepared by polymerizing various phenols with spirobi (meta-dioxane) derivatives, and these resins have many desirable properties. However, they are fairly flammable, and this has somewhat restricted the use of such resins. A flame-resistant spirobi (meta-dioxane) phenolic polymer containing chemically bound phosphorus may be prepared by reacting a mixture of 3,9-dialkenylspirobi (meta-dioxane) and a phenol with the bis-hydrogen thiophosphite (I).

What is claimed is:

1. An organic phosphorus compound having the structural formula

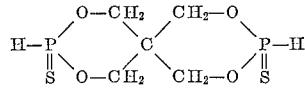

2. A process for preparing pentaerythritol bis-hydrogen thiophosphite which comprises reacting 3,9-dichloro-2,4,8,10-tetraoxa-3,9 - diphosphaspiro[5.5]undecane with hydrogen sulfide in a dialkyl carboxamide solvent at a reaction temperature range of from about 0° C. to about 100° C.

3. The process of claim 2 wherein dimethylacetamide is utilized as the solvent.

4. A process for preparing pentaerythritol bis-hydrogen thiophosphite which comprises providing a solution of 3,9-dichloro - 2,4,8,10 - tetraoxa - 3,9 - diphosphaspiro [5.5]undecane in a dialkyl carboxamide solvent, passing at least an equivalent amount of hydrogen sulfide into said solution at a temperature range of about 0°–100° C., and isolating the thiophosphite from the reaciton mixture.

5. The process of claim 4 wherein dimethylformamide is utilized as the solvent.

6. A process for preparing pentaerythritol bis-hydrogen thiophosphite which comprises reacting 3,9-dichloro-2,4,8,10-tetraoxa-3,9 - diphosphaspiro[5.5]undecane with at least an equivalent amount of hydrogen sulfide in a dimethylacetamide solvent at a temperature range of about 0° C. to about 30° C., adding water to the solution to precipitate the thiophosphite and isolating the thiophosphite.

References Cited by the Examiner

UNITED STATES PATENTS

| | | | |
|---|---|---|---|
| 2,957,856 | 10/60 | Guest et al. | 260—461 |
| 3,014,058 | 12/61 | Willard et al. | 260—461 |
| 3,076,012 | 1/63 | Schicke et al. | 260—461 |
| 3,090,800 | 5/63 | Ratz | 260—461 |

OTHER REFERENCES

Krawiecki et al.: "J. Chem. Soc." (London) (February 1960), pp. 881–885.

CHARLES B. PARKER, *Primary Examiner.*

NICHOLAS S. RIZZO, *Examiner.*